(12) United States Patent
Atlas

(10) Patent No.: US 7,199,828 B2
(45) Date of Patent: Apr. 3, 2007

(54) ACTIVE PIXEL SENSOR CELL ARRAY

(75) Inventor: Eugene Atlas, Irvine, CA (US)

(73) Assignee: ImagerLabs, Irvine, CA (US)

( * ) Notice: Subject to any disclaimer, the term of this patent is extended or adjusted under 35 U.S.C. 154(b) by 738 days.

(21) Appl. No.: 10/304,799

(22) Filed: Nov. 25, 2002

(65) Prior Publication Data

US 2003/0223005 A1 Dec. 4, 2003

Related U.S. Application Data

(60) Provisional application No. 60/383,861, filed on May 28, 2002.

(51) Int. Cl.
*H04N 3/14* (2006.01)
*H04N 5/335* (2006.01)
*H01L 27/00* (2006.01)

(52) U.S. Cl. ............. 348/301; 348/308; 348/310; 250/208.1

(58) Field of Classification Search ........... 348/300, 348/301, 302
See application file for complete search history.

(56) References Cited

U.S. PATENT DOCUMENTS

| | | | | |
|---|---|---|---|---|
| 5,446,529 A | * | 8/1995 | Stettner et al. | 356/4.01 |
| 5,886,343 A | * | 3/1999 | Miyawaki et al. | 250/208.1 |
| 6,532,040 B1 | * | 3/2003 | Kozlowski et al. | 348/241 |
| 6,777,660 B1 | * | 8/2004 | Lee | 250/208.1 |
| 6,809,767 B1 | * | 10/2004 | Kozlowski et al. | 348/308 |
| 6,836,291 B1 | * | 12/2004 | Nakamura et al. | 348/301 |

* cited by examiner

*Primary Examiner*—Ngoc-Yen Vu
*Assistant Examiner*—Richard M. Bemben
(74) *Attorney, Agent, or Firm*—McPherson Kwok Chen & Heid LLP; Tom Chen

(57) ABSTRACT

An active pixel sensor cell array in which a partial transimpedance amplifier amplifies the output of each cell. The pixel sensor cell array comprises a plurality of pixel sensor cells and a second part of the amplifier. Each pixel sensor cell comprises a photo-sensitive element, a capacitor and a first part of an amplifier. The capacitor is coupled between a terminal of the photo-sensitive element and an output line of the cell. The capacitor is operable to provide a capacitive feedback in the pixel sensor cell. The second part of the amplifier is coupled to the output lines of a plurality of pixel sensor cells. The amplifier is configured to amplify an output signal from a cell.

31 Claims, 3 Drawing Sheets

ACTIVE PIXEL SENSOR CELL ARRAY

CLAIM OF PRIORITY

This patent application claims priority under 35 USC §119(e) to co-assigned U.S. Provisional Patent Application Ser. No. 60/383,861, filed on May 28, 2002, which is incorporated by reference.

BACKGROUND

Charge-coupled devices (CCDs) have been the dominant form of conventional imaging circuits for detecting and converting a packet of light photons into an electrical signal that represents the intensity of the light in a particular pixel region of the image. Most commonly, CCDs use a photogate to detect and store the light energy as electrical charge, and a series of electrodes to transfer the collected charge serially to an output.

CCDs have many advantages for obtaining very high quality images. These include high sensitivity, high well capacity, near unity fill factors, low leakage currents and mature processes optimized for imaging. However, CCDs also suffer from some system shortcomings, such as limited readout rates, high power dissipation that increases linearly with read rates, limited linearity and difficulty in integrating signal processing electronics onto the imager focal plane.

To overcome these limitations, recent imaging arrays use active pixel sensor (APS) cells to convert the light photons into electrical charge. With APS, a conventional photodiode is typically combined with MOS Field Effect Transistors (MOSFETs), which provide amplification, readout and timing control.

SUMMARY

An active pixel sensor cell array may be implemented with no more fixed pattern noise than a conventional CCD imager without unacceptably increasing the pixel cell size. In one implementation, an active pixel sensor cell in an active pixel sensor cell array improves performance by simultaneously increasing full well capacity, improving signal linearity, isolating the signal from spurious substrate noise and improving array uniformity (i.e., reducing array non-uniformity).

In one aspect, an active pixel sensor cell array has a high gain amplifier with capacitive feedback that amplifies the output of each cell of the array. The amplifier may be a transimpedance or partial transimpedance amplifier. One part of the high gain amplifier is a current sink, which may be implemented outside of the cells and shared by all cells connected in a column of the array. Another part of the amplifier may be implemented within each cell itself. The output amplification circuitry (amplifier part) within each cell may comprise either PMOS or NMOS type transistors. In one implementation, the output amplification circuitry within each cell may comprise only PMOS type transistors. In one implementation, a single-ended, inverting amplifier (which may also be cascoded) is the amplifier of choice within the pixel cell, while NMOS load circuitry outside of the cells may be shared by all cells of a column. By using PMOS transistors for the amplifier part within each pixel sensor cell, an additional benefit of immunity to substrate noise is gained at a cost of a slightly lower response to red wavelengths.

The high-gain, inverting amplifier may effectively be an op amp. In one implementation, the op amp for each cell comprises PMOS transistors and at least one NMOS transistor. In one implementation, no NMOS transistor is included within the cell itself.

In another implementation, a differential, inverting amplifier (which may also be cascoded) is the amplifier of choice within the pixel cell, while NMOS load circuitry outside of the cells may be shared by all cells of a column. By using differential architecture for the amplifier part within each pixel sensor cell, with either NMOS or PMOS transistors, an additional benefit of immunity to substrate noise is gained at a cost of a slightly lower response to red wavelengths.

The high-gain, inverting amplifier may effectively be an op amp. The op amp for each cell may comprise PMOS transistors and at least one NMOS transistor. Alternatively, no NMOS transistor may be included within the cell itself.

The amplifier design may improve the imager array performance by reducing fixed pattern noise in the image during readout, decreasing the gain non-uniformity of the array, and providing better control of array gain.

The details of one or more implementations are set forth in the accompanying drawings and description. Other features and advantages will be apparent from the description, drawings and claims.

DESCRIPTION OF DRAWINGS

Like reference symbols in the various drawings indicate like elements.

DETAILED DESCRIPTION

Figure 1:
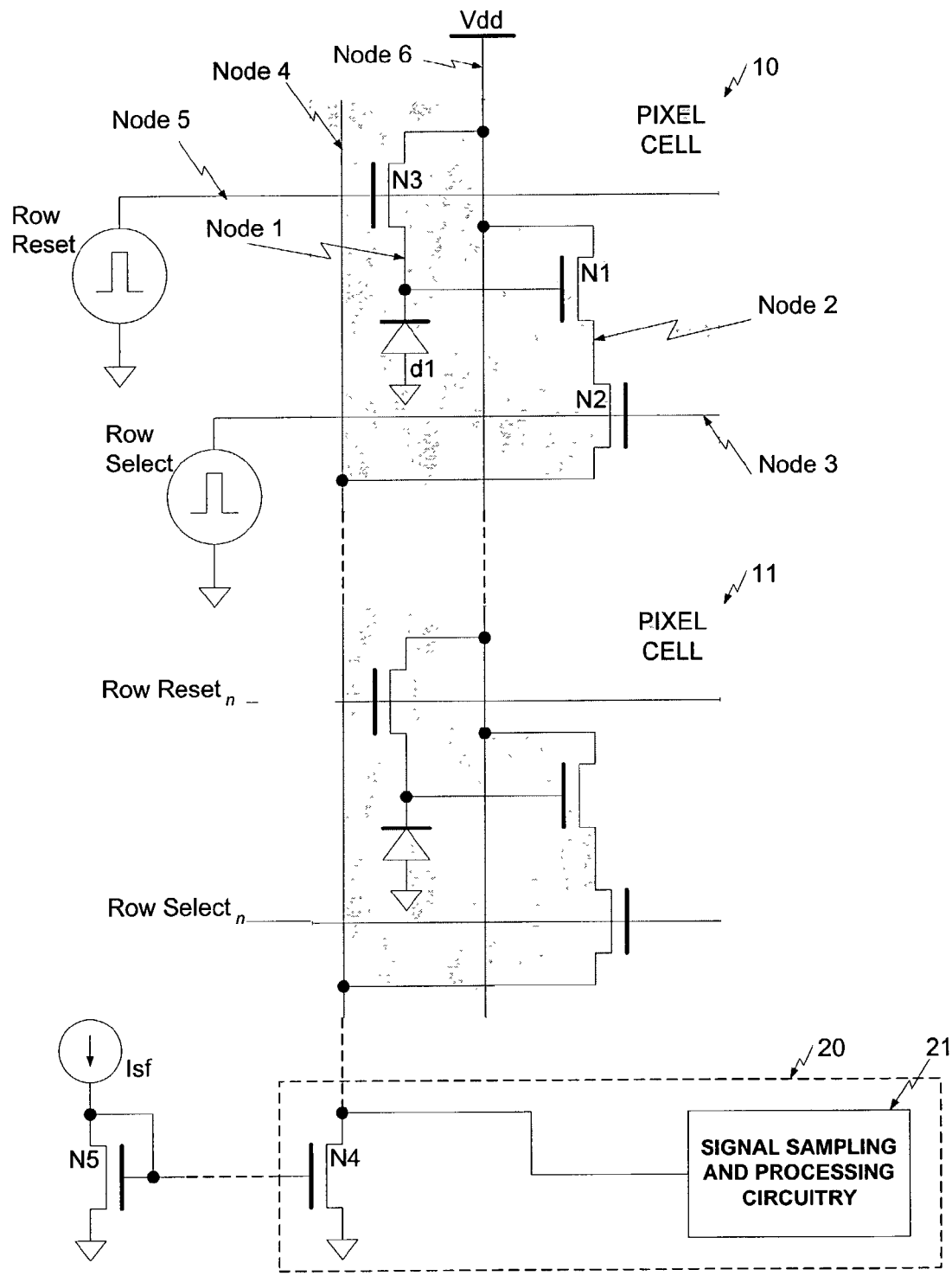
FIG. 1 is a schematic diagram of two CMOS active pixel sensor cells using a conventional source follower design.

FIG. 1 is a schematic diagram of two identical CMOS active pixel sensor cells 10, 11 (also called "pixels" or "cells") that use a conventional source follower design. The cells 10, 11 are connected along a column of an active pixel sensor cell array and to circuitry 20. Circuitry 20 is configured to read all cells connected along the column.

The cell 10 includes a photodiode d1 connected between ground and Node 1, which is coupled to a buffer transistor N1. N1 is an NMOS transistor with a drain connected to the power supply node (Node 6) maintained at potential Vdd, a source connected to Node 2 and a gate connected to Node 1.

Cell 10 also includes a row select transistor N2 and a reset transistor N3, which are both NMOS transistors. Transistor N2 has a drain connected to Node 2, a source connected to Node 4, and a gate connected to Node 3. The gate of transistor N2 is controlled by a ROW SELECT voltage supplied to Node 3.

As shown in FIG. 1, circuitry 20 contains SIGNAL SAMPLING, CONDITIONING AND PROCESSING CIRCUITRY 21, whose input terminal is connected to Node 4. This circuitry 21 includes amplifiers and converters that output digital data indicative of light intensity incident at each selected cell along the column during the sampling period when each cell is selected.

The operation of reading each cell (e.g., cell 10) begins by briefly pulsing the gate of the cell's reset transistor N3 with a high level RESET voltage. This high level of the reset voltage (typically equal to Vdd, where Vdd is typically 3.3 volts in modern CMOS processes) resets the voltage on photodiode d1 to an initial integration voltage to begin an image integration cycle.

Immediately after the reset, the initial integration voltage on photodiode d1 (the voltage at Node 1) is VINI=VRESET−VTN3−VCLOCK, where VTN3 is the threshold voltage of transistor N3, VRESET is the high level RESET voltage signal, and VCLOCK represents capacitive feedthrough noise from the pulsed RESET voltage. The initial voltage at Node 2 is VRESET−VTN3−VCLOCK−VTN1, where VTN1 is the threshold voltage of the buffer transistor N1, which is functioning here as a source follower.

After the reset voltage has been pulsed, and the voltage on photodiode d1 (Node 3) has been reset, the gate of transistor N2 is pulsed with a high level ROW SELECT voltage signal. The high level of the ROW SELECT voltage causes the voltage of Node 2 to appear at Node 4. The signal sampling, conditioning and processing circuitry 21 then amplifies, digitizes and stores the value of the initial integration voltage as it appears at Node 4.

Next, for a controlled time period, photons are allowed to impinge on d1, which creates electron-hole pairs. Photodiode d1 is designed to limit recombination between the newly formed electron-hole pairs.

As a result, the photogenerated holes are attracted to the ground terminal of photodiode d1, while the photogenerated electrons are attracted to the positive terminal of photodiode d1. Each additional electron reduces the voltage at Node 1. At the end of this image collection cycle, a final integration voltage will be present at Node 1: VF=VINI−VS=VRESET−VTN3−VCLOCK−VS, where VS represents the change in the voltage due to the absorbed photons. Similarly, the final integration voltage at node 2 is VRESET−VTN3−VCLOCK−VS−VTN1.

At the end of the image collection cycle, the gate of transistor N2 is pulsed again with a high level ROW SELECT voltage signal to cause the voltage at Node 2 to appear at Node 4. This action generates data indicative of the number of photons that have been collected during the image collection cycle. The circuitry 21 calculates the difference between the digitized final integration voltage taken at the end of the cycle and the digitized stored initial integration voltage taken at the start of the cycle.

After the final integration voltage has been latched by detection and calculation circuit 21, the RESET voltage is again pulsed at node 5 to reset the voltage on photodiode d1 to begin another image collection cycle.

One problem with active pixel sensor cells is that during typical operation, the reset voltage line and the row select voltage line have high levels for periods that are sufficiently long to introduce a substantial amount of 1/f noise into the cell. Such 1/f noise, which results from trapping and de-trapping of surface charges can be accurately modeled as variations in the threshold voltages of transistors N1 and N3. Due to such noise, the voltage that represents the number of photons that are absorbed by photodiode d1 during an image collection cycle is corrupted by V1/f, which is the contribution of the variances of the threshold voltages of N1 and N3. This contribution is an error that limits the accuracy of the cell.

Another problem is active pixel sensor cell arrays that use a conventional source follower amplifier in each cell as in FIG. 1 are also subject to fixed pattern noise due to systematic and random variations between cells. Such fixed pattern noise is due to many different sources of gain variation that cannot easily be corrected with post processing techniques, such as correlated double sampling. It has been proposed to implement a better amplifier within each cell that would be less susceptible to such gain variations from cell to cell by including a CMOS amplifier within each cell. Such a CMOS amplifier includes at least one complimentary transistor (PMOS for NMOS based cells and NMOS for PMOS based cells) as a current source load for the high gain. Unfortunately, it is not currently possible to integrate such a complimentary structure into a single pixel cell without increasing the pixel size to an unacceptable degree.

Conventional CCD imagers are typically subject to significantly less fixed pattern noise than active pixel sensor cell arrays that use the conventional source follower architecture.

Another problem is active pixel sensor cell arrays that use a conventional source follower amplifier in each cell suffer from low voltage output dynamic range. For example, for a 5-Volt supply on Vdd in FIG. 1, the typical output dynamic range for the source follower pixel is approximately 1 Volt. For a 3.3-V supply, the typical output dynamic range for the source follower pixel is approximately 0.7 V. And for a 2.5-V supply, the typical output dynamic range for the source follower pixel is less than 0.5 V. This output voltage limitation limits the effective number of photons that can be absorbed by the pixel, and thus limits its dynamic range to a very low number.

Figure 2:
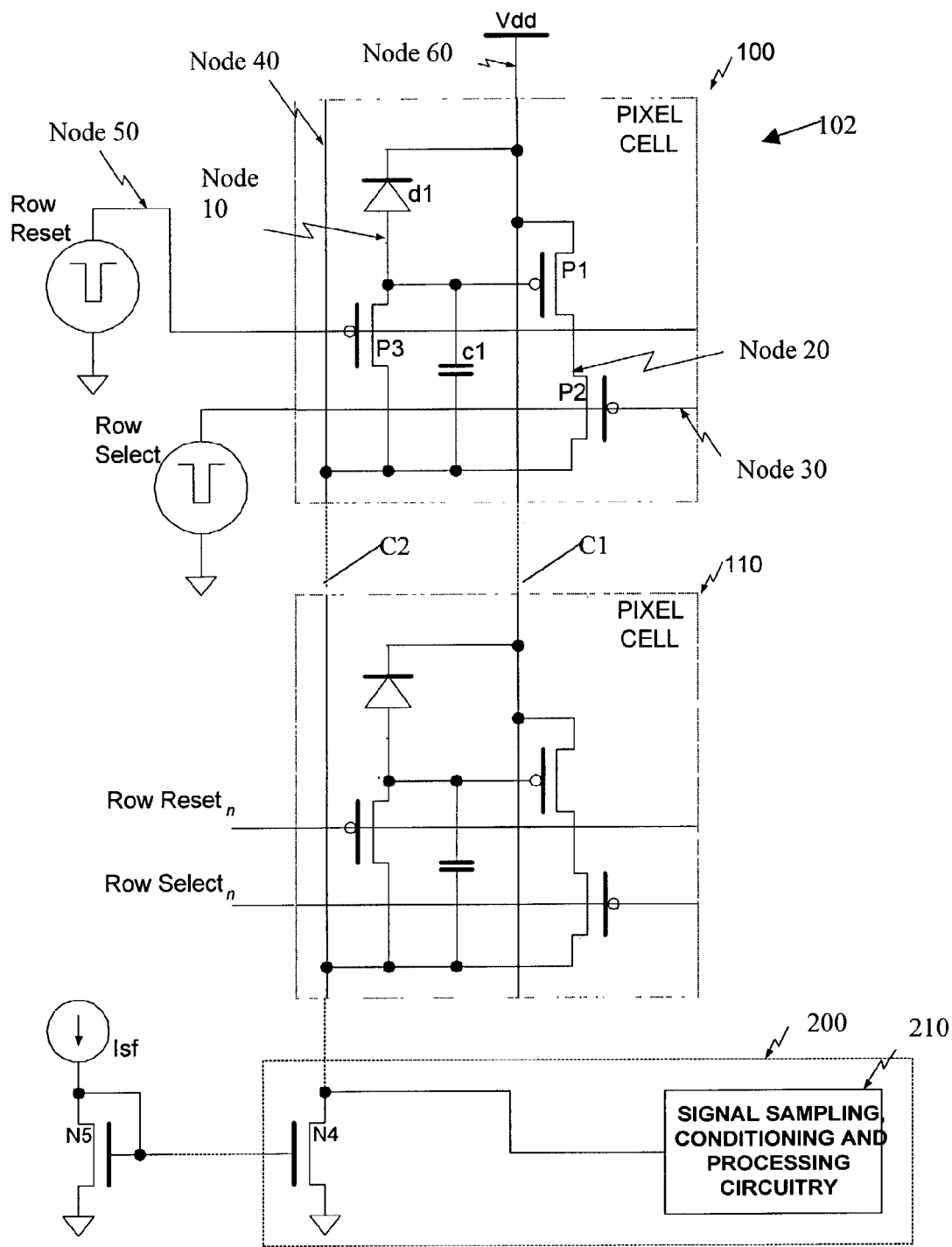
FIG. 2 is a schematic diagram of a portion of an active pixel sensor array that comprises two CMOS active pixel sensor cells according to one implementation.

FIG. 2 is a schematic diagram of a portion of an active pixel sensor array 102 that comprises two active pixel sensor cells 100, 110 according to one implementation. The cells 100, 110 are connected along a column of the active pixel sensor cell array 102. Circuitry 200 is connected to the column and is configured to read all cells of the column. The circuitry 200 may comprise transistors N4 and N5 and current sources I Load to read cells 100 and 110 and any other cells connected along the column. In FIG. 2, transistors P1, P2 and P3 are PMOS transistors, and transistors N4 and N5 are NMOS transistors. In other implementations, the array 102 may comprise other transistors in addition to or instead of P1, P2, P3, N4 and N5.

The pixel sensor cell 100 comprises PMOS transistors P1, P2 and P3, photodiode d1 and an integration capacitor c1. In one implementation, the column along which the cells 100 and 110 are connected has only two column lines C1 and C2. C1 is coupled to the source of P1 and photodiode d1. C2 is coupled to the drains of P2 and P3, as well as integration capacitor c1. Thus, in an integrated circuit implementation, no extra wires need to be fabricated for the new pixel sensor cells 100, 110 compared to the circuit shown in FIG. 1. Thus, no extra space is needed for the wiring of the circuitry of the new pixel sensor cells 100, 110 compared to the conventional structure in FIG. 1. In fact, in one implementation, the only difference in the component count in each pixel of FIG. 2 may be the addition of integration capacitor c1.

The dashed portions of lines C1 and C2 indicate that identical cells may also be connected along the array column in addition to cells 100 and 110. It is contemplated that the array 102 may include a plurality of additional columns and rows of cells that are not shown. Thus, signals ROW SELECT and ROW RESET may be provided simultaneously to all cells connected along the same row as cell 100 but in different columns of the array 102.

Similarly, signals ROW SELECTn and ROW RESETn may be provided simultaneously to all cells connected along the same row as cell 110. Signals ROW SELECTn and ROW RESETn may have the same function as signals ROW SELECT and ROW RESET respectively, but may be pulsed independently from signals ROW SELECT and ROW RESET. If a separate signal sampling and processing circuit 210 is provided for each column, one cell from each column can be simultaneously read with other cells in the same row.

In operation, the pixel readout cycle begins with both ROW SELECT and ROW RESET pulsed low. These two signals pulsed low simultaneously represent a reset function for the pixel 100. Transistor P2 connects Node 40 to Node 20. This connects the high-gain, single-ended amplifier P1, P2, P3 and c1 within the pixel 100 with the shared current source load transistor N4 outside the pixel. Transistor P3 connects Node 10 with Node 40 and forces them to have the same voltage, which forces the voltage across capacitor c1 to be zero.

Once the reset is accomplished, ROW RESET is then brought to a high state, which disconnects Node 10 from Node 40. The voltage at Node 40 at that moment is $V_{INI}=V_{dd}-V_{TP1}-V_{CLOCK}$, where $V_{dd}$ is the voltage of the power supply, $V_{TP1}$ is the threshold voltage of transistor P1, and $V_{CLOCK}$ represents capacitive feedthrough signal from the pulsed reset voltage ROW RESET.

After the RESET voltage is pulsed, and the voltage on photodiode d1 (Node 10) is reset, the gate of transistor P2 is still low with the low level of row select voltage signal ROW SELECT. This condition continues the operation of the amplifier. The signal sampling and processing circuitry 210 then amplifies, digitizes and stores the value of the initial integration voltage as it appears at Node 40.

Once the sampling and processing function is completed, ROW SELECT is pulsed high, which disconnects pixel 100 from the column output bus C2. At that moment, the voltage on Node 10 becomes $V_{DINI}=V_{dd}-V_{TP1}+V_{CLOCK}$ where $V_{dd}$ is the voltage of the power supply, $V_{TP1}$ is the threshold voltage of transistor P1, and $V_{CLOCK}$ represents capacitive feedthrough noise from the pulsed reset voltage ROW RESET.

Next, for a controlled time period, photons are allowed to impinge on photodiode d1 and create electron-hole pairs. Photodiode d1 is designed to limit recombination between the newly formed electron-hole pairs. As a result, the photogenerated electrons are attracted to the Vdd terminal of photodiode d1, while the photogenerated holes are attracted to the negative terminal of photodiode d1. Each additional hole increases the voltage at Node 10. At the end of this image collection cycle, a final integration voltage will be present at Node 10. The final integration voltage is $V_{DF}=V_{DINI}+V_S=V_{dd}-V_{TP1}+V_{CLOCK}+V_S$, where $V_S$ represents the change in the voltage due to the absorbed photons. $V_S$ is proportional to the number of holes that arrived at Node 1. Following the formula of Voltage change=Charge change/Capacitance, then $V_S=Q_{in}/C_{N1}$, where $C_{N1}$ is the total capacitance on Node 10, including the diode capacitance, the capacitance of the gate of P1 and any other parasitic capacitances of the metal and poly lines in the pixel 100.

At the end of the image collection cycle, the gate of transistor P2 is pulsed again with a low level ROW SELECT voltage signal. This signal again activates the amplifier in pixel 100. Because the amplifier is an inverting, high-gain amplifier, Node 10 becomes a virtual ground when the amplifier is activated. Thus, the voltage at Node 10 very quickly goes from $V_{DF}$ back to $V_{DINI}$. The activated amplifier of pixel 100 now acts as a very high quality charge integrator. Since the amplifier is inverting, the voltage at Node 40 goes negative until it reaches $V_F=V_{INI}-V_{Sc1}$, where $V_{Sc1}=V_S*C_{N1}/c1$, where $V_S$ represents the change in the voltage due to the absorbed photons, $C_{N1}$ is the total capacitance on Node 10, and c1 is the capacitance of the capacitor c1 in pixel 100.

Once the voltage $V_F$ has settled on the column output line C2 (Node 40), the signal sampling and processing circuitry 210 then amplifies, digitizes and stores the value of the final integrated voltage as it appears at Node 40. Once the sampling and processing function is completed, ROW RESET is pulsed low again on Node 50, which resets the photodiode d1. Then ROW SELECT is asserted high, which disconnects pixel 100 from the column output bus C2 to begin another image collection cycle.

Once this process is complete, the ROW RESET and ROW SELECT cycle may be repeated on cell 110 and so on until the entire column of pixels is read out in turn and processed by the signal sampling and processing circuitry 210.

By using the saved initial integration voltage $V_{INI}$ and subtracting it from the final integrated voltage $V_F$, the signal sampling and processing circuitry 210 is left with the voltage difference of $V_F-V_{INI}=V_{Sc1}$, where $V_{Sc1}=V_S*C_{N1}/c1$, and $V_S=Q_{in}/C_{N1}$. By combining these two equations, it is clear that $V_{Sc1}=C_{N1}/c1*Q_{in}/C_{N1}=Q_{in}/c1$, while all the parasitic and poorly controlled stray capacitances in the pixel cancel themselves out. Thus, the output of the pixel 100 may depend only on the capacitance of capacitor c1, which may be controlled to a precision of about 1 in 1000. For example, 5 fF for low Dynamic Range and up to 15 fF for high Dynamic Range. Thus, the gain uniformity of the pixel array 102 may be controlled to approximately 0.1%, which may be limited only by the uniformity of c1.

The capacitive feedback in the pixel 100 of FIG. 2 may result in stray insensitive gain resulting in lower gain variation across the array.

The PMOS pixel implementation of FIG. 2 may achieve junction isolation between the PMOS pixel and the P-Substrate that may normally contain digital feedthrough noise.

No additional lines may be needed for the NMOS pixel implementation to provide ground connection to pixel substrate. This allows back thinning of the pixel array for high sensitivity.

An inverting amplifier configuration may increase the voltage dynamic range of the pixel by factor of two (×2).

Figure 3:
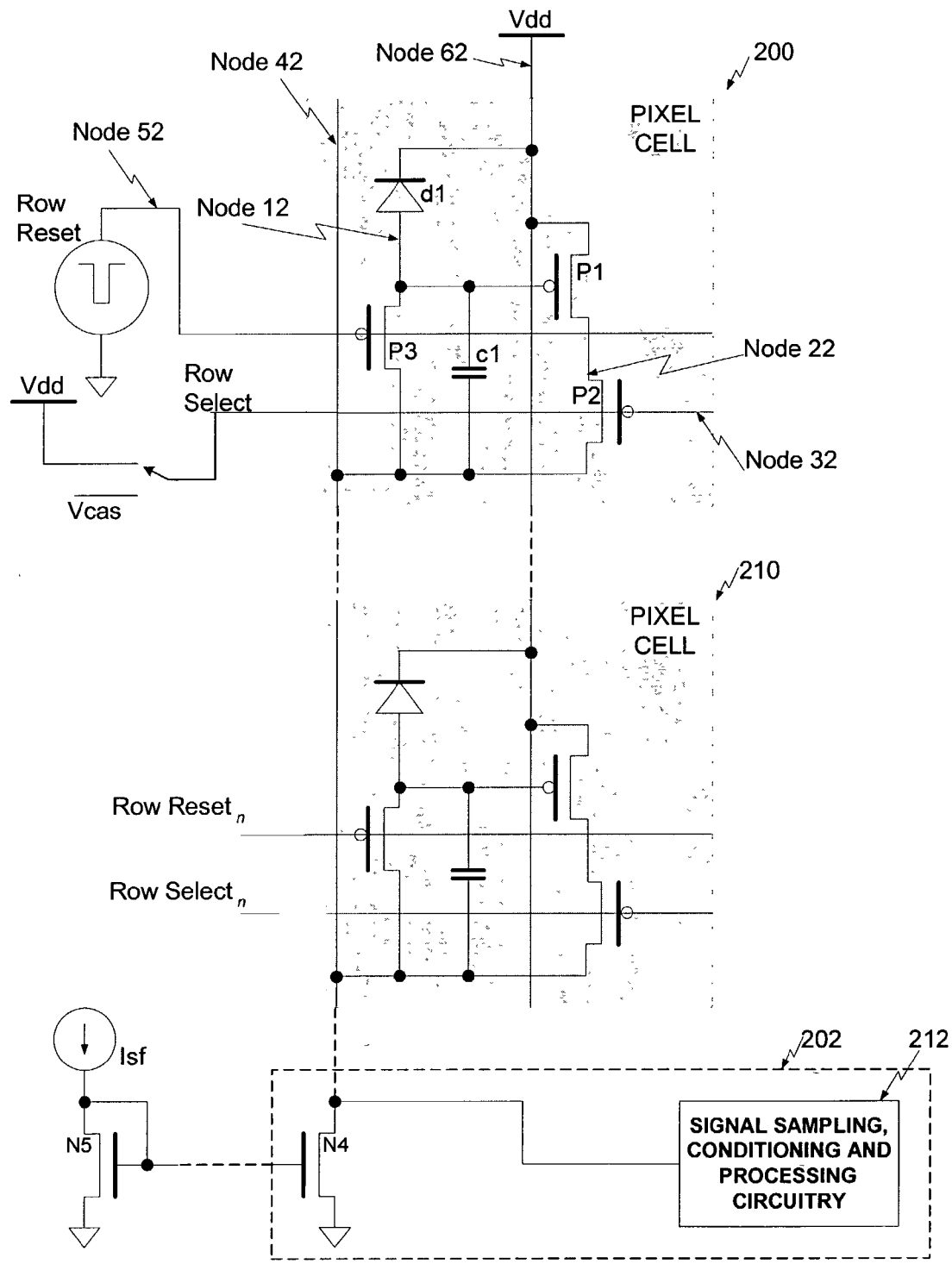
FIG. 3 is a schematic diagram of a variation of the FIG. 2 circuitry.

FIG. 3 is a schematic diagram of a variation of the FIG. 2 circuitry. These pixels 300 use a cascode signal for the row selection function.

A number of implementations have been described. Nevertheless, it will be understood that various modifications may be made. For example, a different number of transistors may be implemented in the pixel 100 than the number of transistors shown in FIG. 2. As another example, the pixel 100 may comprise other components, such as NMOS transistors, in addition to or instead of the components shown in FIG. 2.

In another example, a different number of capacitors may be implemented in the pixel 100 than the number of capacitors shown in FIG. 2 for variable gain and/or multiple gain settings. In addition, non-linear capacitive elements may be implemented in the pixel 100 of FIG. 2 for gain compression.

Another implementation replaces diode D1 in pixel 100 as shown in FIG. 2 by other photo-sensitive elements such as a bipolar junction transistor (BJT) (either PNP or NPN polarity transistors). Additional implementation replaces diode D1 in pixel 100 by a Photogate element. In another example, the diode D1 can be further replaced by a deposited photo sensor on the top of the pixel. In addition, diode D1 in pixel 100 can be replaced by a multiple charge collection photo sensitive elements. As another example, diode D1 in pixel 100 can be replaced by a hybrid interconnected photo sensitive sensor on the top of the pixel.

Accordingly, other implementations are within the scope of the following claims.

What is claimed is:

1. A pixel sensor cell array comprising:
    a plurality of pixel sensor cells, each pixel sensor cell comprising:
        a photo-sensitive element;
        a capacitor having first and second terminals, wherein a terminal of the photosensitive element and the first terminal of the capacitor are connected to a first node;
        an output line of the cell being a second node, wherein the second terminal of the capacitor connected to the second node; and
        a first part of an amplifier; and
    a second part of the amplifier, the second part being coupled to the output lines of a plurality of pixel sensor cells, the amplifier being configured to amplify an output signal from a cell.

2. The pixel sensor cell array of claim 1, wherein the first part of the amplifier comprises a plurality of PMOS transistors.

3. The pixel sensor cell array of claim 1, wherein the first part of the amplifier comprises a plurality of PMOS transistors but does not comprise NMOS transistors.

4. The pixel sensor cell array of claim 1, wherein the first part of the amplifier comprises a plurality of NMOS transistors, but does not comprise PMOS transistors.

5. The pixel sensor cell array of claim 1, wherein the first part of the amplifier comprises a single-ended, inverting amplifier.

6. The pixel sensor cell array of claim 1, wherein the second part of the amplifier comprises a current sink.

7. The pixel sensor cell array of claim 1, wherein the second part of the amplifier comprises at least one NMOS transistor.

8. The pixel sensor cell array of claim 1, wherein the second part of the amplifier comprises at least one PMOS transistor.

9. The pixel sensor cell array of claim 1, wherein the amplifier comprises a transimpedance amplifier.

10. The pixel sensor cell array of claim 1, wherein the cells are organized in columns, each column of cells being coupled to a second part of an amplifier via an output bus.

11. The pixel sensor cell array of claim 1, further comprising a voltage source coupled to photo-sensitive elements in a plurality of pixel sensor cells.

12. The pixel sensor cell array of claim 1, further comprising a voltage source coupled to at least one pixel sensor cell, the voltage source being configured to apply a reset signal to the pixel sensor cell.

13. The pixel sensor cell array of claim 1, further comprising a voltage source coupled to at least one pixel sensor cell, the voltage source being configured to apply a select signal that couples the output line of the pixel sensor cell to the second part of the amplifier.

14. The pixel sensor cell array of claim 1, further comprising at least one additional capacitor for setting a variable gain.

15. The pixel sensor cell array of claim 1, further comprising at least one additional capacitor for multiple gain settings.

16. The pixel sensor cell array of claim 1, further comprising at least one non-linear capacitive element for gain compression.

17. The pixel sensor cell array of claim 1, wherein the photo-sensitive element comprises a photodiode.

18. The pixel sensor cell array of claim 1, wherein the photo-sensitive element comprises a bipolar junction transistor.

19. The pixel sensor cell array of claim 1, wherein the photo-sensitive element comprises a deposited photo sensor on top of a pixel.

20. The pixel sensor cell array of claim 1, wherein the photo-sensitive element comprises a multiple charge collection photo sensitive element.

21. The pixel sensor cell array of claim 1, wherein the photo-sensitive element comprises a hybrid interconnected photo sensitive sensor on top of a pixel.

22. The pixel sensor cell array of claim 1, wherein the first part of the amplifier comprises a MOS transistor coupled between the photo-sensitive element and the output line, the MOS transistor having a control gate coupled to a reset signal and directly connected to the output line.

23. The pixel sensor cell away of claim 1, wherein each pixel sensor cell consists of a photodiode, three MOS transistors, and a capacitor.

24. A system comprising:
    an array of pixel sensor cells, each pixel sensor cell comprising:
        a photo-sensitive element;
        a capacitor having first and second terminals, wherein a terminal of the photo-sensitive element and the first terminal of the capacitor are connected to a first node;
        an output line of the cell being a second node, wherein the second terminal of the capacitor is connected to the second node; and
        a first part of an amplifier; and
    a means for sampling and processing a signal from an output line of a cell in the array, the means for sampling and processing being coupled to a plurality of cells in a column, the means for sampling and processing comprising a second part of the amplifier, the amplifier being configured to amplify an output signal from a cell.

25. The system of claim 24, wherein the photo-sensitive element is a photodiode.

26. A pixel sensor cell comprising:
    a photodiode coupled to a voltage source line;
    a capacitor having first and second terminals, wherein a terminal of the photodiode and the first terminal of the capacitor are connected to a first node;
    an output line of the cell being a second node, wherein the second terminal of the capacitor is connected to the second node;
    a first metal oxide semiconductor (MOS) transistor coupled to the voltage source line and the photodiode;
    a second MOS transistor coupled to the first MOS transistor, the output line and a select signal line; and
    a third MOS transistor coupled to the photodiode, a reset signal line and the output line.

27. The pixel sensor cell of claim 26, wherein the transistors comprise PMOS transistors.

28. The pixel sensor cell of claim 26, wherein the transistors comprise NMOS transistors.

29. The pixel sensor cell of claim 26, wherein the third MOS transistor is directly connected to the output line.

30. A method comprising:
- connecting a first terminal of a capacitor and a first terminal of a photo-sensitive element to a first node;
- connecting a second terminal of the capacitor to a second node, wherein the second node is an output line of a pixel sensor cell;
- coupling the pixel sensor cell to an external current source load transistor, which forces a voltage level across the capacitor in the pixel sensor cell to substantially zero;
- amplifying and storing an initial integration output voltage level of the pixel sensor cell;
- decoupling the pixel sensor cell from the current source load transistor;
- exposing the pixel sensor cell to photons during a controlled time period;
- storing an amount of charge in the capacitor proportional to an amount of photons absorbed by the pixel sensor cell;
- coupling the pixel sensor cell to the external current source load transistor, which integrates charge stored as a result of photons absorbed by the pixel sensor cell; and
- amplifying and storing a final integration output voltage level of the pixel sensor cell.

31. The method of claim 30, further comprising comparing the initial integration output voltage level with the final integration output voltage level to determine an amount of photons absorbed by the pixel sensor cell.

* * * * *